UNITED STATES PATENT OFFICE.

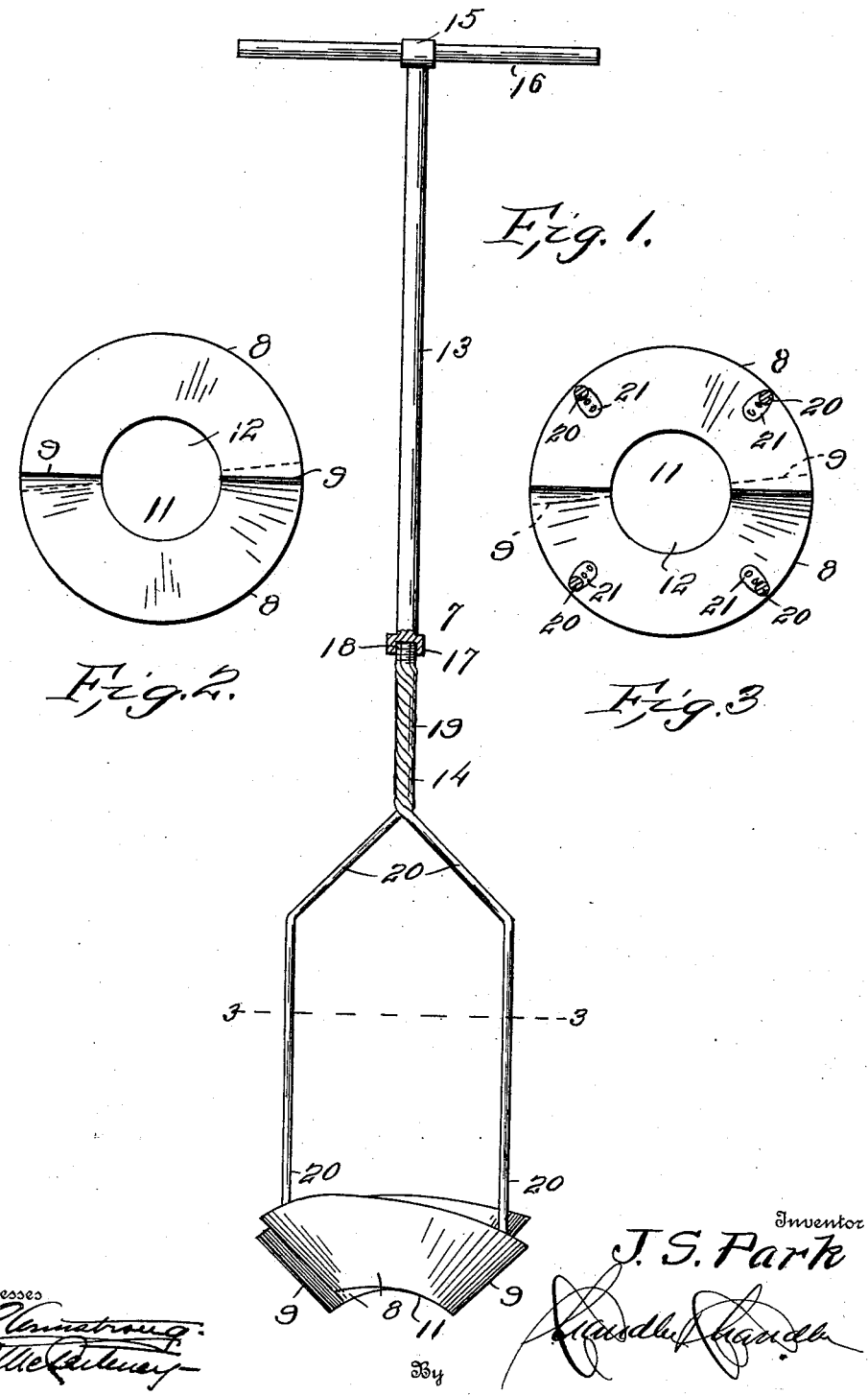

JOHN S. PARK, OF ROCKPORT, INDIANA.

EARTH-AUGER.

No. 886,242. Specification of Letters Patent. Patented April 28, 1908.

Application filed August 29, 1907. Serial No. 390,650.

*To all whom it may concern:*

Be it known that I, JOHN S. PARK, a citizen of the United States, residing at Rockport, in the county of Spencer, State of Indiana, have invented certain new and useful Improvements in Earth-Augers; and I do hereby declare the following to be a full, clear, and exact description of the invention, such as will enable others skilled in the art to which it appertains to make and use the same.

The present invention has reference to earth augers, and it aims to provide an exceedingly simple device of that nature especially designed for boring post holes and removing the dirt therefrom.

To this end the invention resides in the provision of an auger comprising a handle which terminates at its lower end in two oppositely-arranged pairs of feet, each pair being connected to one of the cutting blades.

The invention further consists in the particular construction, combination, and arrangement of parts, all as hereinafter fully described, specifically claimed, and illustrated in the accompanying drawings in which like parts are designated by corresponding reference numerals throughout the several views.

Of said drawings: Figure 1 is a front elevation of an auger constructed in accordance with the present invention. Fig. 2 is a bottom plan view of the blades. Fig. 3 is a horizontal section on the line 3—3 of Fig. 1, looking towards the blades.

In its practical embodiment the auger comprises a two-part handle 7, and a pair of oppositely-disposed semi-circular blades 8 each formed of a concavo-convex plate of steel, the blades being inclined inwardly and downwardly towards each other, as shown. Said blades are furthermore set at a slight angle with respect to each other, so that the cutting edge 9 of each blade lies below the adjacent edge of the opposite blade and extends a slight distance therebeneath. The blades of the auger therefore may be regarded as having a relation to each other somewhat similar to that existing between the wings of a screw-conveyer.

A semi-circular strip is cut away from the lower end of each blade, as indicated by the reference numeral 11, and since the two blades are disposed opposite each other the cut-away portions will approximately register and form a circular opening or channel 12, through which the earth passes upwardly, in the form of a cylinder or core, when the auger is in use.

The handle 7, by means of which the instrument is rotated, consists of an upper member 13 and a lower member 14, the former being provided at its upper end with a transversely arranged sleeve 15 through which a rod 16 is passed, and having an annular enlargement or collar 17 formed on its lower end, which collar is provided with an interiorly threaded socket 18, as shown in Fig. 1. The lower member of the handle is constructed of a series of metal rods whose upper ends are intertwisted to form a stem 19, the lower portions of the rods radiating from said stem and forming downwardly-extending feet 20, the free end of each foot being widened so as to form a toe 21 which is secured to the adjacent blade. In the present instance four feet are shown, two of which are fastened to each blade, the pairs of feet so formed being disposed opposite each other. The several rods which form the stem 19 have their intertwisted upper ends welded together, the end of said stem being exteriorly threaded for engagement in the threaded socket 18, above referred to. The rods are sufficiently strong to withstand the downward pressure thereon, when the implement is in use.

Owing to the fact that the handle is formed in sections, the blade-carrying member thereof may be readily detached from the upper member, and a second member provided with a blade of a different size or type may be substituted.

The formation of the channel 12 due to the registering of the cutaway portions 11 of the blades causes a cylindrical core of uncut earth to pass therethrough when the implement is in operation, the core being augmented and compressed to a certain extent by the earth cut by the edges 9 of the blades, which earth is forced against the core by the angular disposition of the blades. The core so formed is broken off, on reaching a certain height, by the withdrawal of the implement. It will therefore be apparent that a hole can be cut with an expenditure of much less force and, in consequence in less time and with greater ease, as above stated. The auger blades are furthermore set slightly to one side of each other, thus causing the cutting edge of each blade to project slightly beyond the adjacent edge of the opposite blade.

What is claimed, is,

1. The combination, in an auger, of a pair of concavo-convex semicircular blades arranged opposite and set at an angle to each other, to dispose the cutting edge of each blade directly beneath the adjacent edge of the opposite blade, the lower ends of said blades being cut away to form a channel therebetween through which a cylindrical core of uncut earth is adapted to pass, when the auger is rotated, and an operating handle provided at its lower end with a plurality of radiating feet secured to each of said blades.

2. The combination, in an auger, of an operating handle consisting of an upper member having a socketed lower end, and a lower member formed of rods intertwisted to provide a stem portion and feet radiating therefrom, the upper end of the stem being adapted to fit in said socket, and a pair of oppositely-disposed concavo-convex blades, each blade having a plurality of said feet attached at their lower ends thereto.

3. The combination, in an auger, of an operating handle consisting of an upper member having a socketed lower end and a lower member formed of rods intertwisted to provide a stem portion and depending feet radiating therefrom, the upper end of the stem being adapted to fit in said socket, and a pair of concavo-convex blades arranged opposite and set at an angle to each other, to dispose the cutting edge of each blade beneath the adjacent edge of the opposite blade, the lower ends of said blades being cut away to form a channel therebetween through which a cylindrical core of uncut earth is adapted to pass, when the auger is rotated, each blade having a plurality of said feet attached at their lower ends thereto.

In testimony whereof, I affix my signature, in presence of two witnesses.

JOHN S. PARK.

Witnesses:
W. F. ATKINSON,
J. M. KILLIAN.